US012598389B2

(12) United States Patent
Miyazawa et al.

(10) Patent No.: US 12,598,389 B2
(45) Date of Patent: Apr. 7, 2026

(54) IMAGING DEVICE, SENSOR CHIP, AND PROCESSING CIRCUIT

(71) Applicant: SONY SEMICONDUCTOR SOLUTIONS CORPORATION, Kanagawa (JP)

(72) Inventors: Akihiro Miyazawa, Kanagawa (JP); Kouichi Mazeno, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/863,037

(22) PCT Filed: Apr. 27, 2023

(86) PCT No.: PCT/JP2023/016577
§ 371 (c)(1),
(2) Date: Nov. 5, 2024

(87) PCT Pub. No.: WO2023/218980
PCT Pub. Date: Nov. 16, 2023

(65) Prior Publication Data
US 2025/0301224 A1 Sep. 25, 2025

(30) Foreign Application Priority Data

May 13, 2022 (JP) ................................. 2022-079195

(51) Int. Cl.
*H04N 23/69* (2023.01)
*G06T 5/70* (2024.01)
(Continued)

(52) U.S. Cl.
CPC .............. *H04N 23/69* (2023.01); *G06T 5/70* (2024.01); *G06T 7/215* (2017.01); *H04N 23/61* (2023.01);
(Continued)

(58) Field of Classification Search
CPC ...... H04N 23/69; H04N 23/61; H04N 23/673; H04N 23/73; H04N 23/651; H04N 23/675;
(Continued)

(56) References Cited

U.S. PATENT DOCUMENTS

2003/0218687 A1* 11/2003 Sato ...................... H04N 23/635
348/E5.045
2013/0038699 A1* 2/2013 Hayashi ................. G03B 35/10
348/47
2017/0230567 A1* 8/2017 Takao .................. H04N 25/445

FOREIGN PATENT DOCUMENTS

JP     2000-078483 A    3/2000
JP     2008-252648 A    10/2008
(Continued)

OTHER PUBLICATIONS

International Search Report and Written Opinion of PCT Application No. PCT/JP2023/016577, issued on Jun. 27, 2023, 09 pages of ISRWO.

*Primary Examiner* — Thai Q Tran
*Assistant Examiner* — Jose M Mesa
(74) *Attorney, Agent, or Firm* — CHIP LAW GROUP

(57) ABSTRACT

The present disclosure relates to an imaging device, a sensor chip, and a processing circuit capable of more suitably acquiring a high-quality image.
The sensor chip includes a pixel array unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate, a parameter calculation unit calculates a correction parameter for correcting the full-angle-of-view image on the basis of the region images of the plurality of frames, and a process-
(Continued)

ing circuit includes a processing unit which outputs the full-angle-of-view image reflecting correction based on the correction parameter to a subsequent stage. The present disclosure can be applied to an imaging device which captures and outputs a moving image.

16 Claims, 15 Drawing Sheets

(51) Int. Cl.

| | | |
|---|---|---|
| *G06T 7/215* | (2017.01) | |
| *H04N 23/61* | (2023.01) | |
| *H04N 23/65* | (2023.01) | |
| *H04N 23/67* | (2023.01) | |
| *H04N 23/73* | (2023.01) | |
| *H04N 25/40* | (2023.01) | |

(52) U.S. Cl.
CPC ......... *H04N 23/651* (2023.01); *H04N 23/673* (2023.01); *H04N 23/675* (2023.01); *H04N 23/73* (2023.01); *H04N 25/41* (2023.01); *G06T 2207/20201* (2013.01); *G06T 2207/30196* (2013.01)

(58) Field of Classification Search
CPC ........... H04N 25/41; G06T 7/215; G06T 5/70; G06T 2207/20201; G06T 2207/30196
See application file for complete search history.

(56) References Cited

FOREIGN PATENT DOCUMENTS

| | | |
|---|---|---|
| JP | 2015-119206 A | 6/2015 |
| JP | 2021-034786 A | 3/2021 |
| WO | 2020/218201 A1 | 10/2020 |
| WO | 2021/033388 A1 | 2/2021 |

* cited by examiner

IMAGING DEVICE, SENSOR CHIP, AND PROCESSING CIRCUIT

CROSS REFERENCE TO RELATED APPLICATIONS

This application is a U.S. National Phase of International Patent Application No. PCT/JP2023/016577 filed on Apr. 27, 2023, which claims priority benefit of Japanese Patent Application No. JP 2022-079195 filed in the Japan Patent Office on May 13, 2022. Each of the above-referenced applications is hereby incorporated herein by reference in its entirety.

TECHNICAL FIELD

The present disclosure relates to an imaging device, a sensor chip, and a processing circuit, and more particularly, to an imaging device, a sensor chip, and a processing circuit capable of more suitably acquiring a high-quality image.

BACKGROUND ART

Patent Document 1 discloses an imaging element that reads signals of all pixels in a pixel array unit at a first frame rate and reads signals of pixels in a specific region in the pixel array unit at a second frame rate higher than the first frame rate. According to the imaging element of Patent Document 1, it is possible to realize read driving for pixels in a specific region and read driving for pixels of an entire angle of view with a small circuit scale and low power consumption.

CITATION LIST

Patent Document

Patent Document 1: Japanese Patent Application Laid-Open No. 2021-34786

SUMMARY OF THE INVENTION

Problems to be Solved by the Invention

In a case where correction data is detected from an acquired image data (frame) and fed back to an image for recording, a frame for detecting the correction data is required, and thus, it is not possible to suitably acquire a high-quality image due to a decrease in the frame rate of the corrected image or the like.

The present disclosure has been made in view of such a situation, and an object thereof is to more suitably acquire a high-quality image.

Solutions to Problems

An imaging device according to the present disclosure is an imaging device including: a sensor chip which includes a pixel control unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate; a parameter calculation unit which calculates a correction parameter for correcting the full-angle-of-view image on the basis of the region images of the plurality of frames; and a processing circuit which includes a processing unit which outputs the full-angle-of-view image reflecting correction based on the correction parameter to a subsequent stage.

A sensor chip of the present disclosure is a sensor chip including: a pixel control unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate; a parameter calculation unit which calculates a correction parameter for correcting the full-angle-of-view image on the basis of the region images of the plurality of frames; and a processing unit which outputs the full-angle-of-view image corrected by using the correction parameter.

A processing circuit of the present disclosure is a processing circuit including: a parameter calculation unit which calculates a correction parameter for correcting the full-angle-of-view image on the basis of region images of a plurality of frames output from a sensor chip enabling simultaneous output of a full-angle-of-view image of one frame and the region images of the plurality of frames by reading pixel signals of an entire pixel region at a first frame rate and reading pixel signals of a specific region in the pixel region at a second frame rate higher than the first frame rate; and a processing unit which outputs, to a subsequent stage, the full-angle-of-view image corrected by using the correction parameter.

In the present disclosure, a full-angle-of-view image of one frame and region images of a plurality of frames are simultaneously output by reading pixel signals of an entire pixel region at a first frame rate and reading pixel signals of a specific region in the pixel region at a second frame rate higher than the first frame rate, a correction parameter for correcting the full-angle-of-view image is calculated on the basis of the region images of the plurality of frames, and the full-angle-of-view image reflecting correction based on the correction parameter is output to a subsequent stage.

BRIEF DESCRIPTION OF DRAWINGS

FIG. 4 is a diagram for explaining DSS driving.

FIG. 5 is a diagram illustrating a configuration example of a sensor chip and an SoC.

FIG. 10 is a diagram illustrating a detailed configuration example of an AE processing unit.

FIG. 15 is a block diagram illustrating a configuration example of an imaging device.

MODE FOR CARRYING OUT THE INVENTION

Hereinafter, modes for carrying out the present disclosure (hereinafter referred to as embodiments) will be described. Note that the description is given in the following order.

1. Problems of related art
2. DSS Driving
3. Configuration and operation of sensor chip and SoC
4. First embodiment (example of blur correction)
5. Second embodiment (example of brightness correction)
6. Third Embodiment (example of focus control by phase difference AF)
7. Fourth Embodiment (example of improvement in performance of contrast AF)
8. Specifications required for SoC
9. Application example

1. Problems of Related Art

Figure 1:
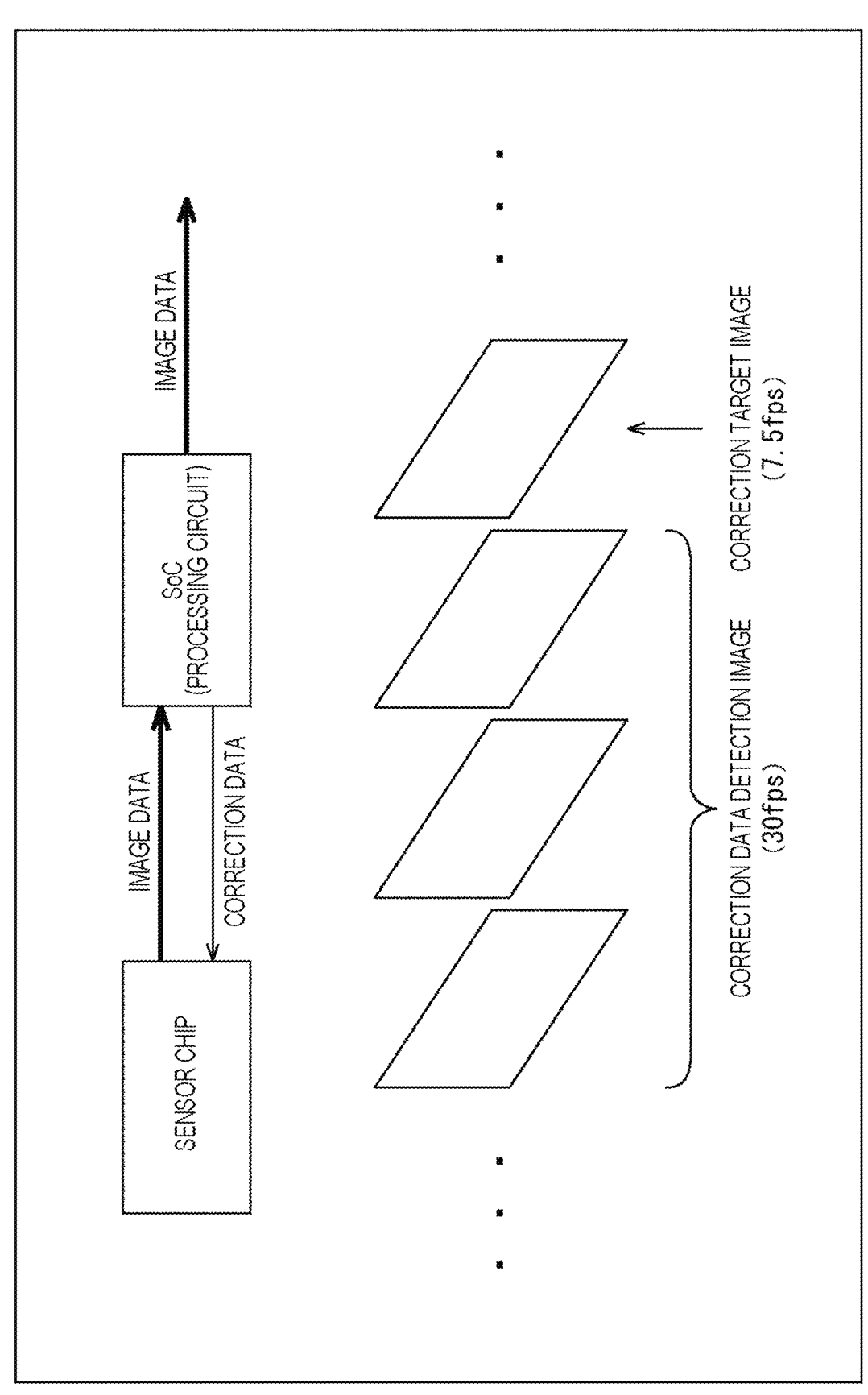
FIG. 1 is a diagram for explaining a problem of a related art.

FIG. 1 illustrates a configuration in which a sensor chip outputs image data, and a processing circuit (SoC: System-on-a-chip) acquires image data and outputs the image data as an image for recording to a subsequent stage.

In such a configuration, in a case where the correction data is detected from the image data (frame) acquired by the processing circuit and fed back to the image for recording, a frame (correction data detection image) for detecting the correction data is required. Therefore, the frame rate of the corrected image (correction target image) finally output from the processing circuit decreases. For example, as illustrated in FIG. 1, in a case where the frame rate of the image data output from the sensor chip is 30 fps and the correction target image is corrected by using three consecutive frames as the correction data detection image, the frame rate of the correction target image decreases to 7.5 fps.

In particular, in order to improve the accuracy of the correction data to be detected, it is necessary to set more frames as the correction data detection image, and the frame rate of the correction target image further decreases.

Figure 2:
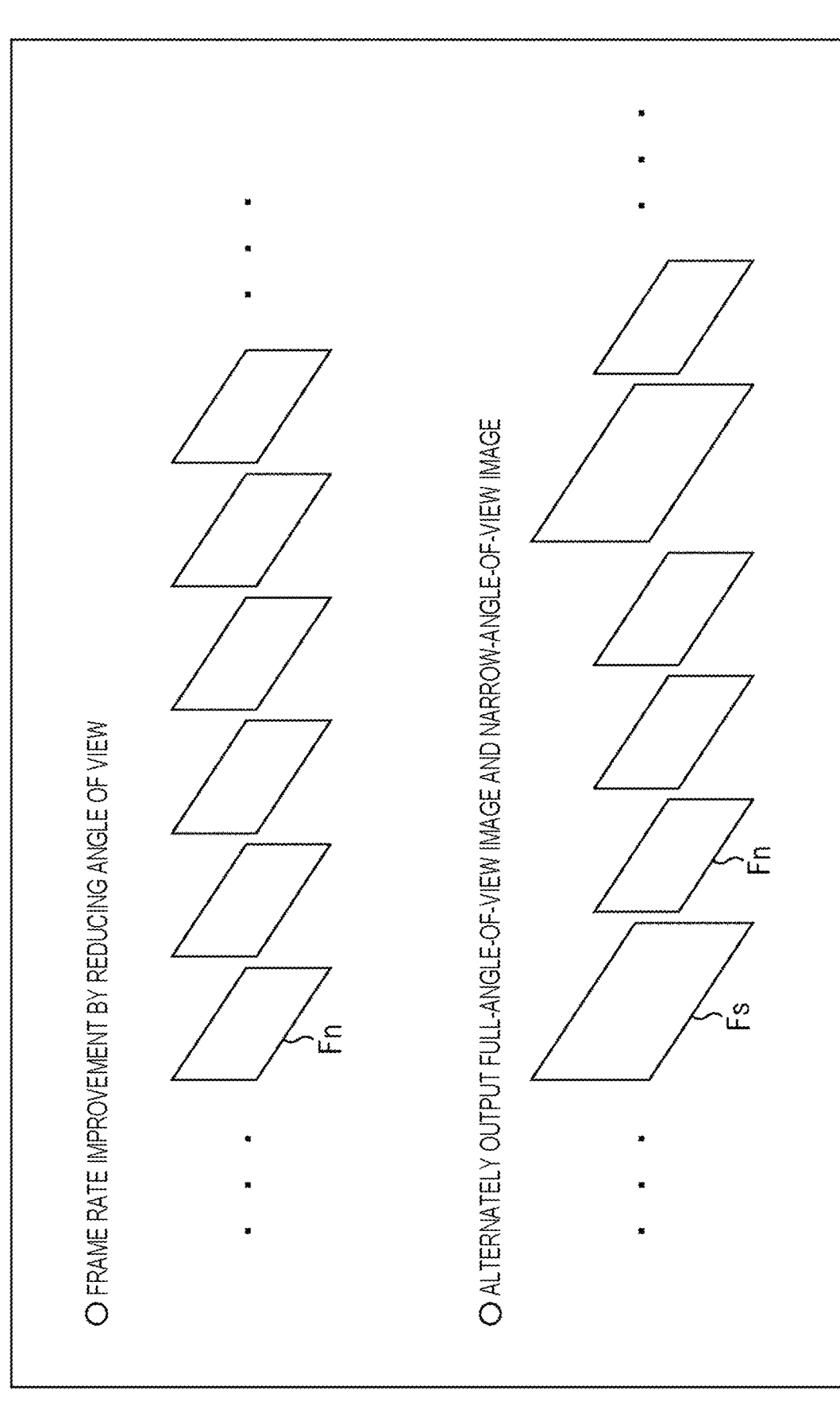
FIG. 2 is a diagram for explaining the problem of the related art.

In this regard, in order to improve the accuracy of the correction data to be detected, as illustrated in the upper part of FIG. 2, it is conceivable to improve the frame rate (perform high-speed imaging) by the sensor chip outputting a narrow-angle-of-view image Fn with a reduced angle of view. However, in this case, the spatial resolution of the corrected image after the angle of view is corrected becomes low.

Furthermore, as illustrated in the lower part of FIG. 2, it is also conceivable that the sensor chip can maintain a spatial resolution by alternately outputting a full-angle-of-view image Fs to be the correction target image and the narrow-angle-of-view images Fn of a plurality of frames to be the correction data detection image. However, in this case, communication related to register control for mode (angle of view) switching occurs between the SoC at the subsequent stage and the sensor chip, and power consumption increases.

Furthermore, by adopting a sensor mounted on a super slow motion camera (high speed camera), it is possible to realize high-speed imaging and maintenance of spatial resolution, but the cost increases.

In this regard, in the present disclosure, a sensor enabling simultaneous output of a full-angle-of-view image and a region image is used to calculate a correction parameter on the basis of region images of a plurality of frames and feed back the calculated correction parameter to the full-angle-of-view image, whereby it is possible to more suitably acquire a high-quality image.

2. DSS Driving

As disclosed in Patent Document 1, an imaging element that reads signals of all pixels in a pixel array unit at a first frame rate and reads signals of pixels in a specific region in the pixel array unit at a second frame rate higher than the first frame rate is known.

In an imaging device to which the technology according to the present disclosure is applied, the imaging element (sensor chip) of Patent Document 1 is adopted.

Figure 3:
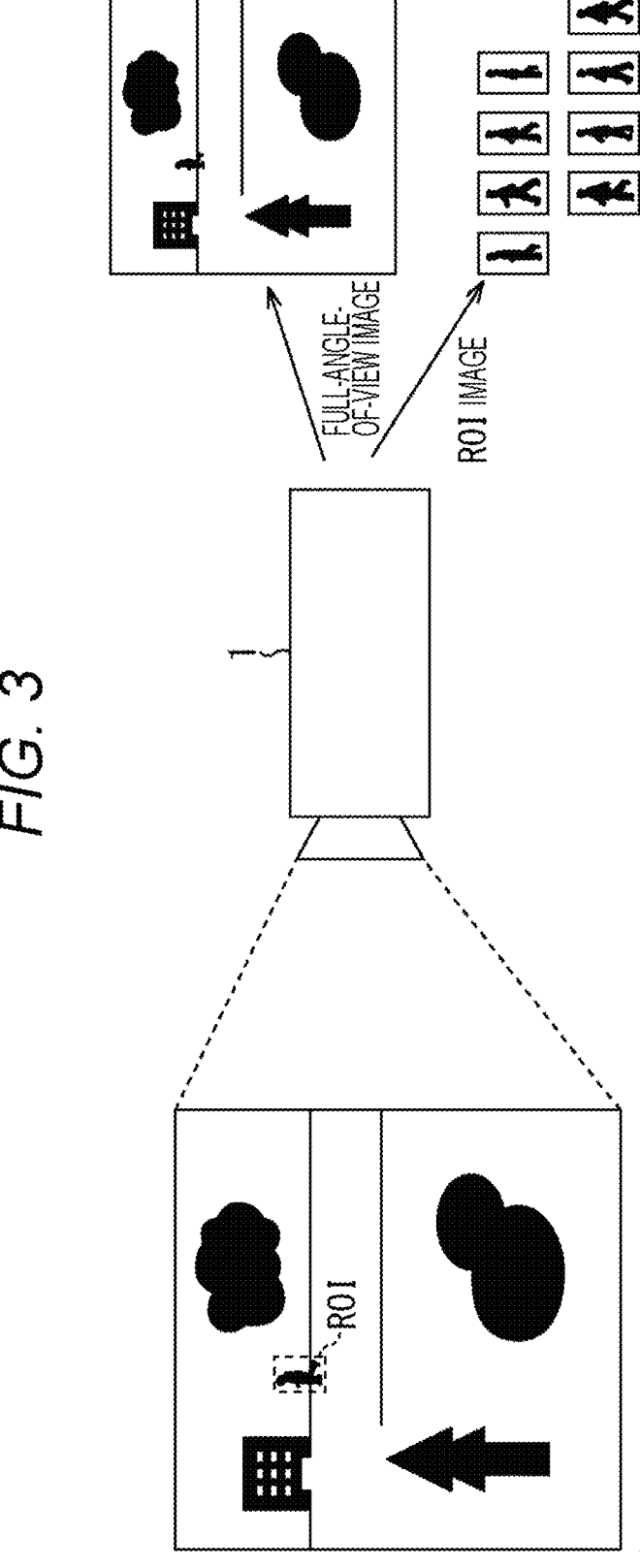
FIG. 3 is a diagram for explaining DSS driving.

As illustrated in FIG. 3, a sensor chip forming the imaging device 1 to which the technology according to the present disclosure is applied has a chip structure including a single chip having one row of analog to digital (AD) converters that perform AD conversion on signals read from pixels. The sensor chip of the present disclosure reads pixel signals of the entire region in a pixel array unit (pixel region) at the first frame rate, and reads pixel signals of a specific region (region of interest (ROI)) in the pixel region at the second frame rate higher than the first frame rate. Hereinafter, in particular, the second frame rate is also referred to as a high frame rate.

As described above, the sensor chip of the present disclosure has a structure in which a plurality of controls is performed on a single pixel array unit and a pixel signal of a corresponding region is read out. In the sensor chip of the present disclosure, by devising read control including AD conversion under a plurality of controls, a load of circuit resources and power is suppressed, and output of a full-angle-of-view image and output of an ROI image of a high frame rate are realized. The "output of an ROI image" refers to the output of the region image of the specific region.

The driving system of the sensor chip that simultaneously outputs the full-angle-of-view image and the ROI image as described above is hereinafter referred to as dual speed stream (DSS) driving.

In the DSS driving, as described above, control of reading the pixel signal of the full-angle-of-view image at the first frame rate is performed, and control of reading the pixel signal of the ROI image at the second frame rate higher than the first frame rate is performed. Among them, for example, the angle of view of the ROI image decreases as the frame rate (second frame rate) increases.

Here, the cutout processing of the specific region (ROI) will be described with reference to FIG. 4.

First, the read operation of the pixel signal of each pixel of the pixel row in a range including the ROI is repeatedly executed on the basis of a vertical ROI component, that is, vertical address information (vertical ROI position information). Therefore, as illustrated in FIG. 4, a horizontally long image including the ROI is acquired. For this horizontally long image, processing of cutting out only the rectangle of the ROI portion and masking the other portion is performed on the basis of a horizontal ROI component, that is, horizontal address information (horizontal ROI position information). By such processing, the amount of output data can be reduced.

Figure 4:
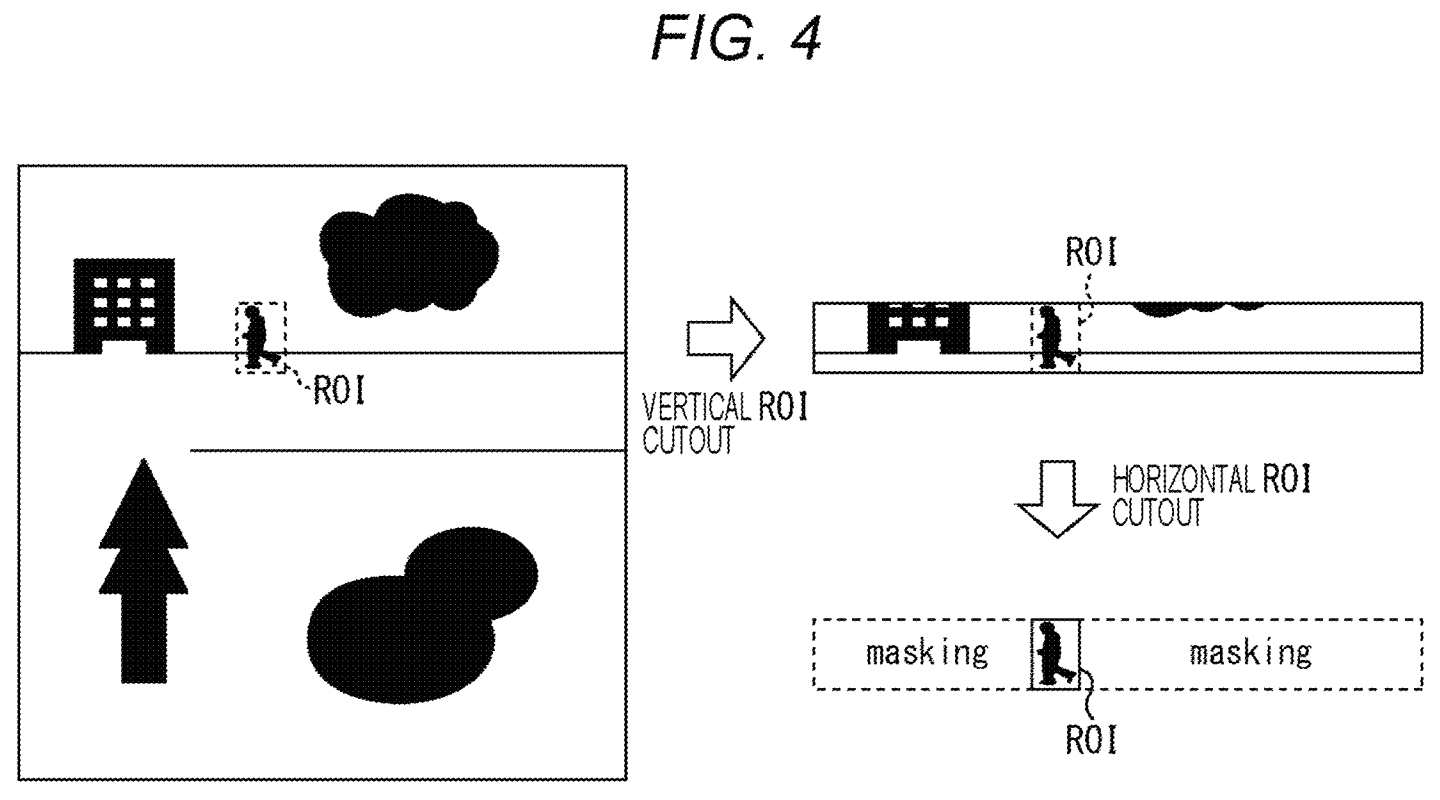

Note that, in the example of FIG. 4, the image obtained by cutting out only the ROI portion from the horizontally long image acquired on the basis of the vertical ROI component is set as the ROI image, but the horizontally long image acquired on the basis of the vertical ROI component may be set as the ROI image as it is.

3. Configuration and Operation of Sensor Chip and SoC

Here, a configuration of a sensor chip capable of the above-described DSS driving and an SoC (processing circuit) that feeds back ROI position information indicating the position of the ROI in the pixel region to the sensor chip in real time and an operation thereof will be described.

Figure 5:
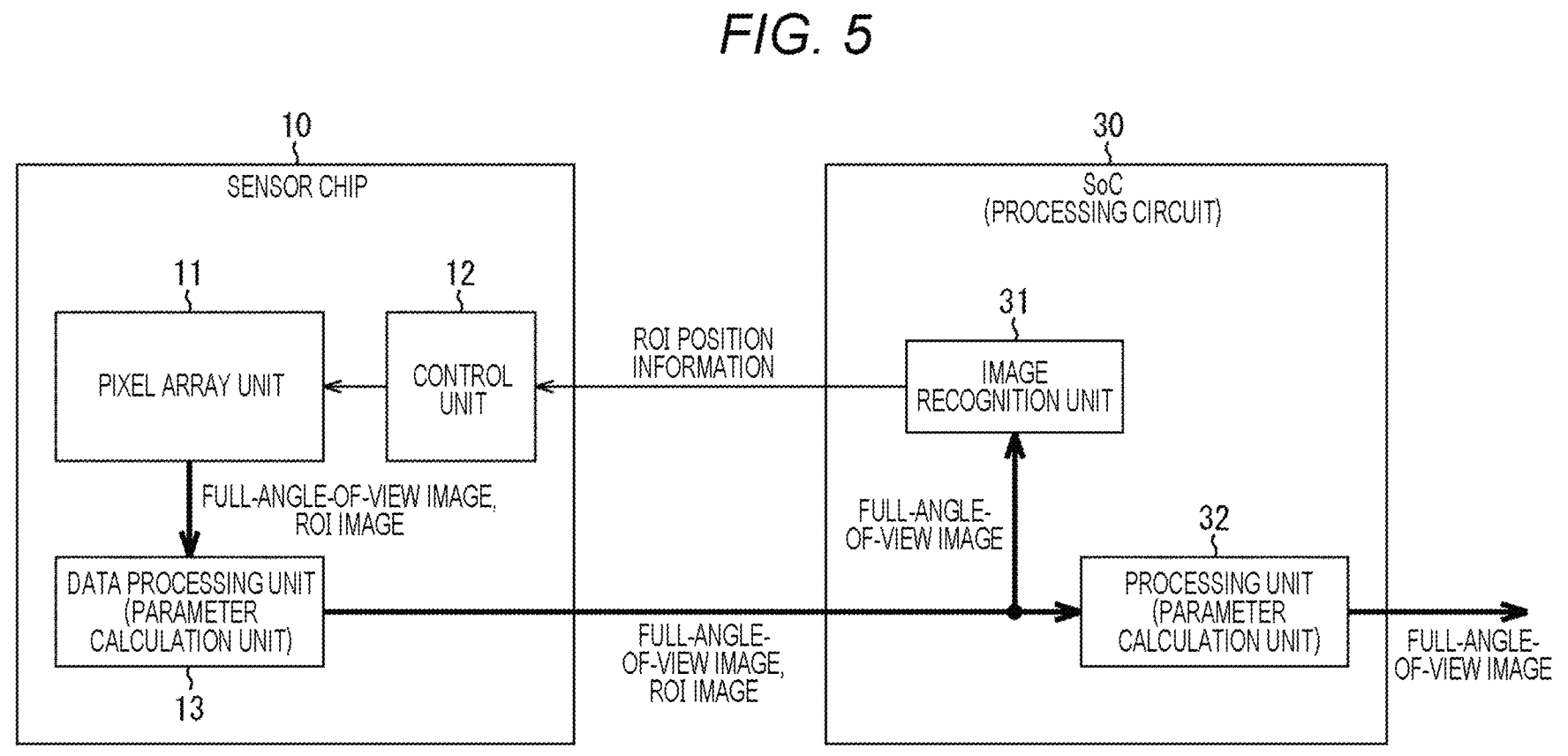

FIG. 5 is a diagram illustrating a configuration example of a sensor chip and an SoC to which the technology according to the present disclosure can be applied.

As illustrated in FIG. 5, a sensor chip 10 includes a pixel array unit 11, a control unit 12, and a data processing unit 13, and an SoC 30 includes an image recognition unit 31 and a processing unit 32.

In the pixel array unit 11, pixels including photoelectric conversion units (light receiving elements) are two-dimensionally arranged in a row direction (horizontal direction) and a column direction (vertical direction), that is, in a matrix.

The control unit 12 is configured as a pixel control unit that performs read control of pixel signals of pixels in the pixel array unit 11 on the basis of various timing signals, clock signals, control signals, and the like. The control unit 12 drives each pixel of the pixel array unit 11 on a row basis or the like.

Specifically, the control unit 12 reads the pixel signals of the entire pixel region in the pixel array unit 11 at the first frame rate, and reads the pixel signals of the specific region (ROI) in the pixel array unit 11 at the second frame rate (high frame rate) on the basis of the ROI position information from the SoC 30. By such read control of the control unit 12, a full-angle-of-view image of one frame and ROI images of a plurality of frames can be simultaneously output.

The data processing unit 13 includes, for example, an AD converter, a latch circuit, and the like provided for each pixel column. Specifically, the data processing unit 13 converts an analog pixel signal output in units of pixel rows for each pixel column into a digital signal, performs predetermined data processing on the converted pixel data, and then outputs the digital signal to the SoC 30 as an image (image data).

In a case where the sensor chip 10 is driven in a normal driving mode, the data processing unit 13 outputs the full-angle-of-view image at the first frame rate. In a case where the sensor chip 10 is driven in a DSS driving mode capable of outputting a plurality of ROI images in one frame period, the data processing unit 13 outputs the full-angle-of-view image at the first frame rate and outputs the ROI image at the second frame rate. Hereinafter, the full-angle-of-view image of one frame and the ROI images of a plurality of frames simultaneously output during one frame period are collectively referred to as a frame set.

The image recognition unit 31 of the SoC 30 determines a specific region (ROI) in the pixel region of the pixel array unit 11 on the basis of the image recognition for the full-angle-of-view image from the sensor chip 10, and outputs ROI position information indicating the position of the ROI in the pixel region to the sensor chip 10. Therefore, the sensor chip 10 can output the ROI image by reading the pixel signal of the ROI determined by the SoC 30. Note that the image recognition unit 31 can also be provided in the sensor chip 10.

The processing unit 32 outputs, to the subsequent stage, the full-angle-of-view image reflecting the correction based on the correction parameter calculated on the basis of the ROI images of the plurality of frames from the sensor chip 10.

The processing unit 32 can have a function of a parameter calculation unit that calculates a correction parameter. In this case, the processing unit 32 calculates a correction parameter for correcting the full-angle-of-view image on the basis of the ROI images of the plurality of frames from the sensor chip 10, and corrects the full-angle-of-view image by using the calculated correction parameter.

Here, a flow of processing related to image correction by the sensor chip 10 and the SoC 30 will be described with reference to FIG. 6.

In a case where the sensor chip 10 is driven in the normal driving mode, the full-angle-of-view image is output from the sensor chip 10 at the first frame rate. In this processing, in step S1, when the driving in the DSS driving mode is set, a full-angle-of-view image is output from the sensor chip 10 at the first frame rate, and a plurality of ROI images is output at the second frame rate.

Figure 6:
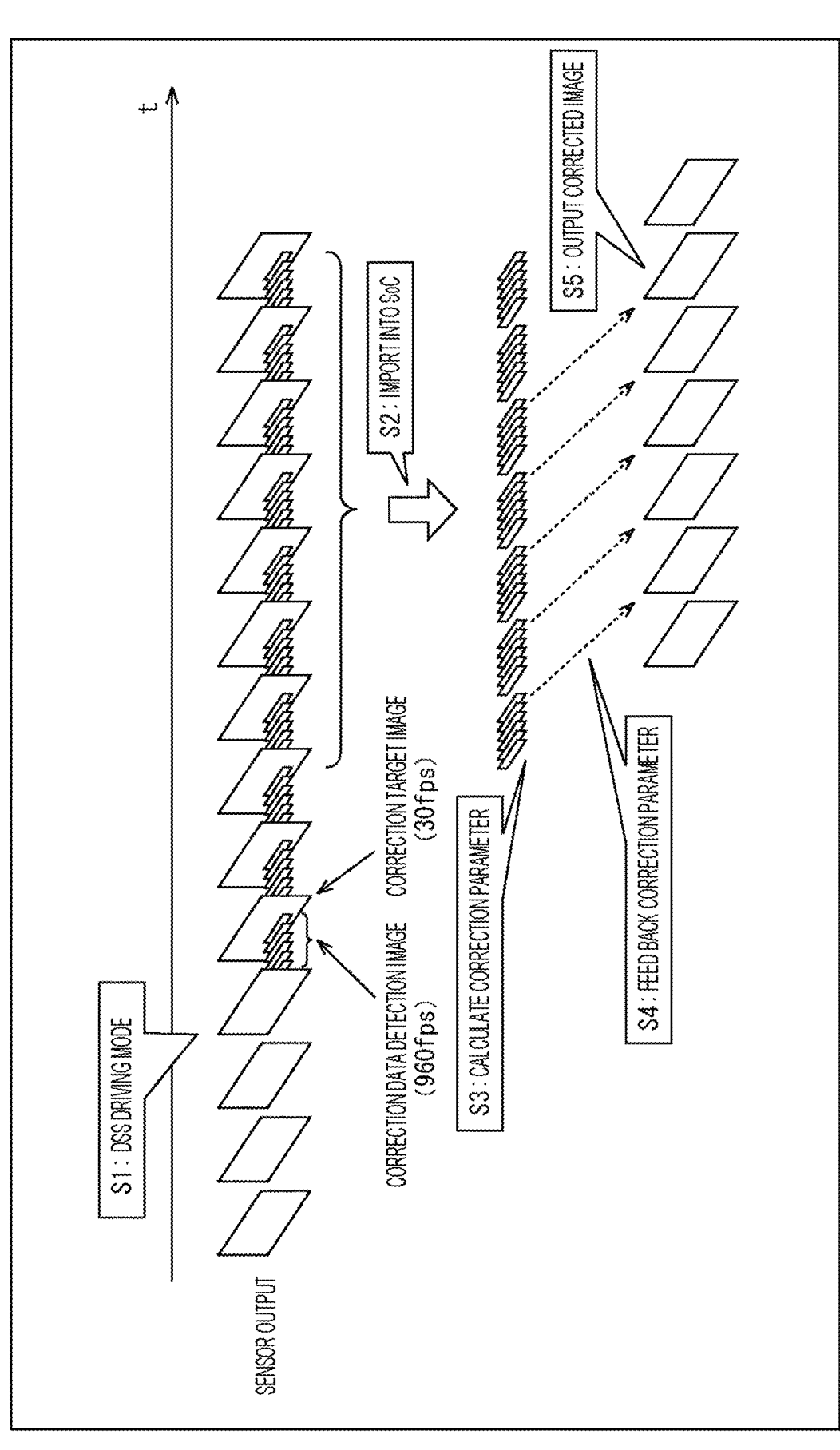
FIG. 6 is a diagram for explaining a flow of processing regarding image correction.

In the example of FIG. 6, the full-angle-of-view image is output as the correction target image at 30 fps, and the plurality of ROI images is output as the correction data detection image at 960 fps. Note that the frame rate of the ROI image can be arbitrarily set and changed according to the angle of view of the ROI image, the accuracy of the detected correction data (calculated correction parameter), the use of the corrected image to be finally output, or the like.

When the correction target image (full-angle-of-view image) and the plurality of correction data detection images (ROI images) are imported into the SoC 30 in step S2, the SoC 30 detects correction data from the plurality of correction data detection images to calculate a correction parameter in step S3.

Thereafter, in step S4, the SoC 30 feeds back the calculated correction parameter to the correction target image. As a result, in step S5, the correction target image reflecting the correction based on the correction parameter is output as the corrected image.

According to the above configuration and processing, the full-angle-of-view image of one frame and the ROI images of the plurality of frames are output as a frame set every frame period by the DSS driving, so that it is possible to detect the correction data at high speed and to prevent a decrease in the frame rate of the corrected image finally output from the SoC 30.

Furthermore, by using a sensor chip capable of DSS driving, it is possible to reduce a communication amount between the SoC 30 and the sensor chip 10 while maintaining a spatial resolution with the low-cost sensor chip 10.

As described above, according to the technology according to the present disclosure, it is possible to more suitably acquire a high-quality image.

Note that, in FIG. 5, the data processing unit 13 of the sensor chip 10 may have the function of the parameter calculation unit. In this case, the data processing unit 13 calculates a correction parameter for correcting the full-angle-of-view image on the basis of the ROI image of the plurality of frames without outputting the ROI images of the plurality of frames to the SoC 30, and corrects the full-angle-of-view image by using the calculated correction parameter.

Hereinafter, specific configurations of the sensor chip and the SoC according to the embodiment of the present disclosure will be described.

4. First Embodiment

Figure 7:
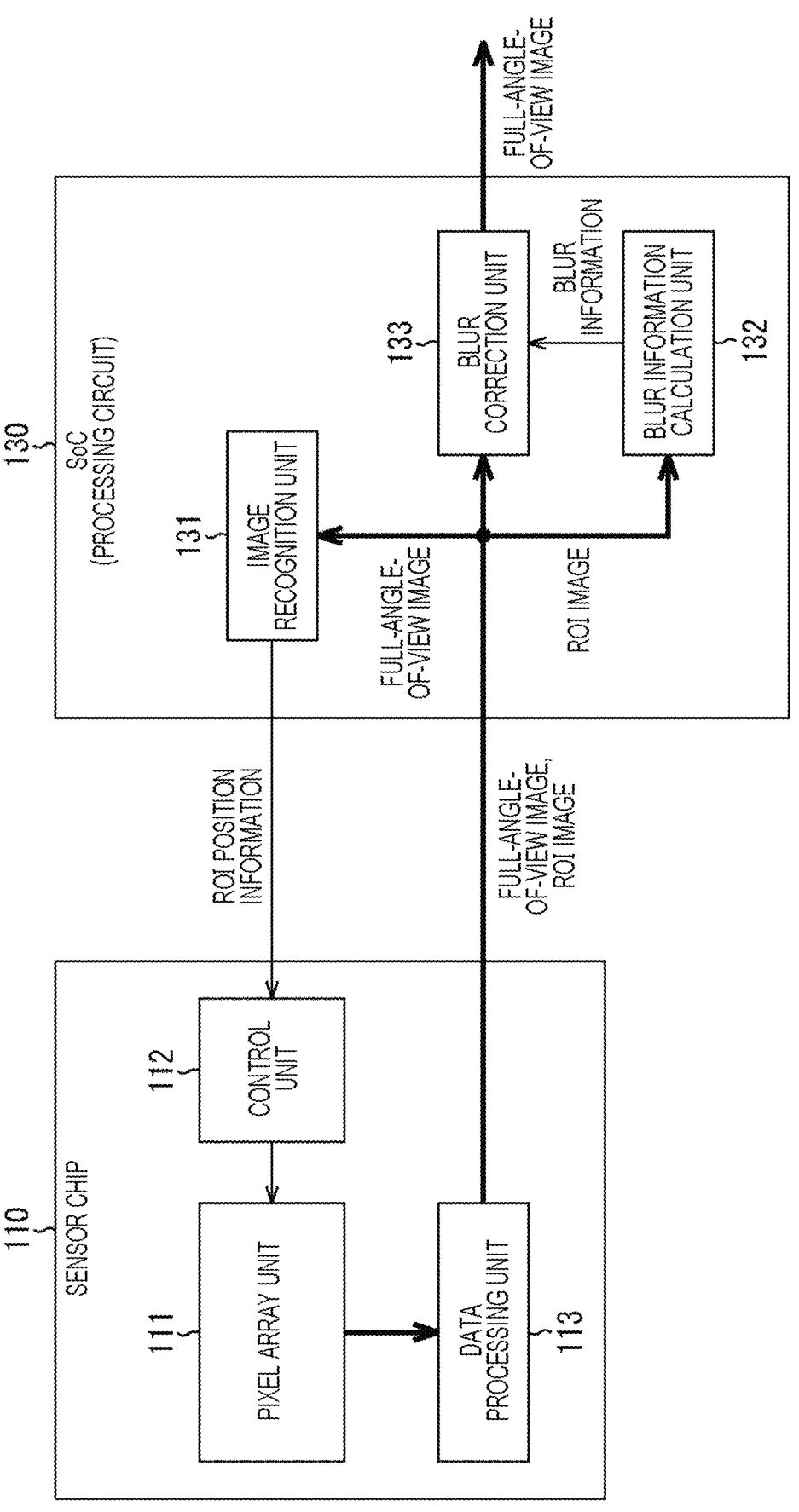
FIG. 7 is a diagram illustrating a configuration example of a sensor chip and an SoC of a first embodiment.

FIG. 7 is a diagram illustrating a configuration example of a sensor chip and an SoC of a first embodiment of the present disclosure.

As illustrated in FIG. 7, a sensor chip 110 includes a pixel array unit 111, a control unit 112, and a data processing unit 113, and an SoC 130 includes an image recognition unit 131, a blur information calculation unit 132, and a blur correction unit 133.

The pixel array unit 111, the control unit 112, and the data processing unit 113 included in the sensor chip 110 are configured similarly to the pixel array unit 11, the control unit 12, and the data processing unit 13 described with reference to FIG. 5, respectively, and thus description thereof is omitted.

The image recognition unit 131 included in the SoC 130 is configured similarly to the image recognition unit 31 described with reference to FIG. 5, and thus the description thereof is omitted. On the other hand, the blur information calculation unit 132 and the blur correction unit 133 correspond to the processing unit 32 described with reference to FIG. 5.

The blur information calculation unit 132 is configured as the parameter calculation unit in the present embodiment. The blur information calculation unit 132 calculates blur information indicating a blur trajectory (blur amount) by detecting a motion vector as correction data from the ROI images of the plurality of frames from the sensor chip 10, and supplies the blur information to the blur correction unit 133.

In the SoC 130, on the basis of the image recognition by the image recognition unit 131, the ROI is determined by detecting a notable subject that is a motion vector detection target. That is, the blur information calculation unit 132 calculates the blur information by detecting the motion vector from the notable subject appearing in the ROI image. Note that the notable subject to be recognized in the image recognition can be designated by a user, for example.

The blur correction unit 133 corrects the blur of the full-angle-of-view image from the sensor chip 10 on the basis of the blur information from the blur information calculation unit 132, and outputs the corrected full-angle-of-view image to the subsequent stage.

Figure 8:
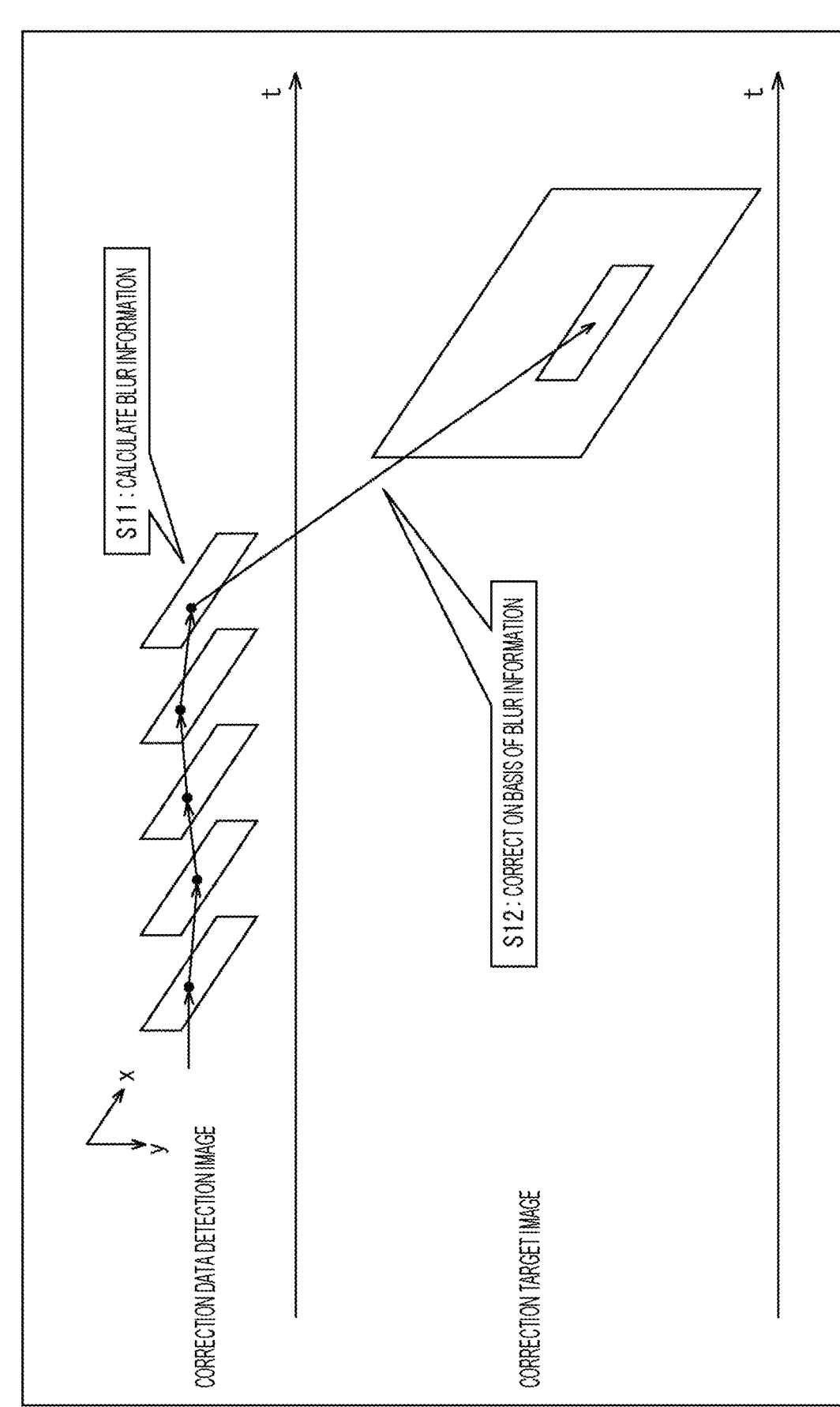
FIG. 8 is a diagram for explaining a flow of blur correction.

A flow of the blur correction by the SoC 130 will be described with reference to FIG. 8.

In step S11, the blur information calculation unit 132 calculates the blur information by setting, as a correction data detection image, ROI images of a plurality of frames forming a certain frame set and detecting a motion vector between the frames.

In step S12, on the basis of the blur information calculated by the blur information calculation unit 132, the blur correction unit 133 sets, for example, a full-angle-of-view image forming the next frame set as the correction target image and corrects the blur thereof.

By repeating the above operation for each frame set, the corrected full-angle-of-view image is output to the subsequent stage at, for example, 30 fps.

According to the above configuration and operation, the blur information can be calculated at high speed by using the sensor capable of DSS driving, and thus a high-quality image without blurring can be acquired without decreasing the frame rate of the corrected image to be finally output.

5. Second Embodiment

Figure 9:
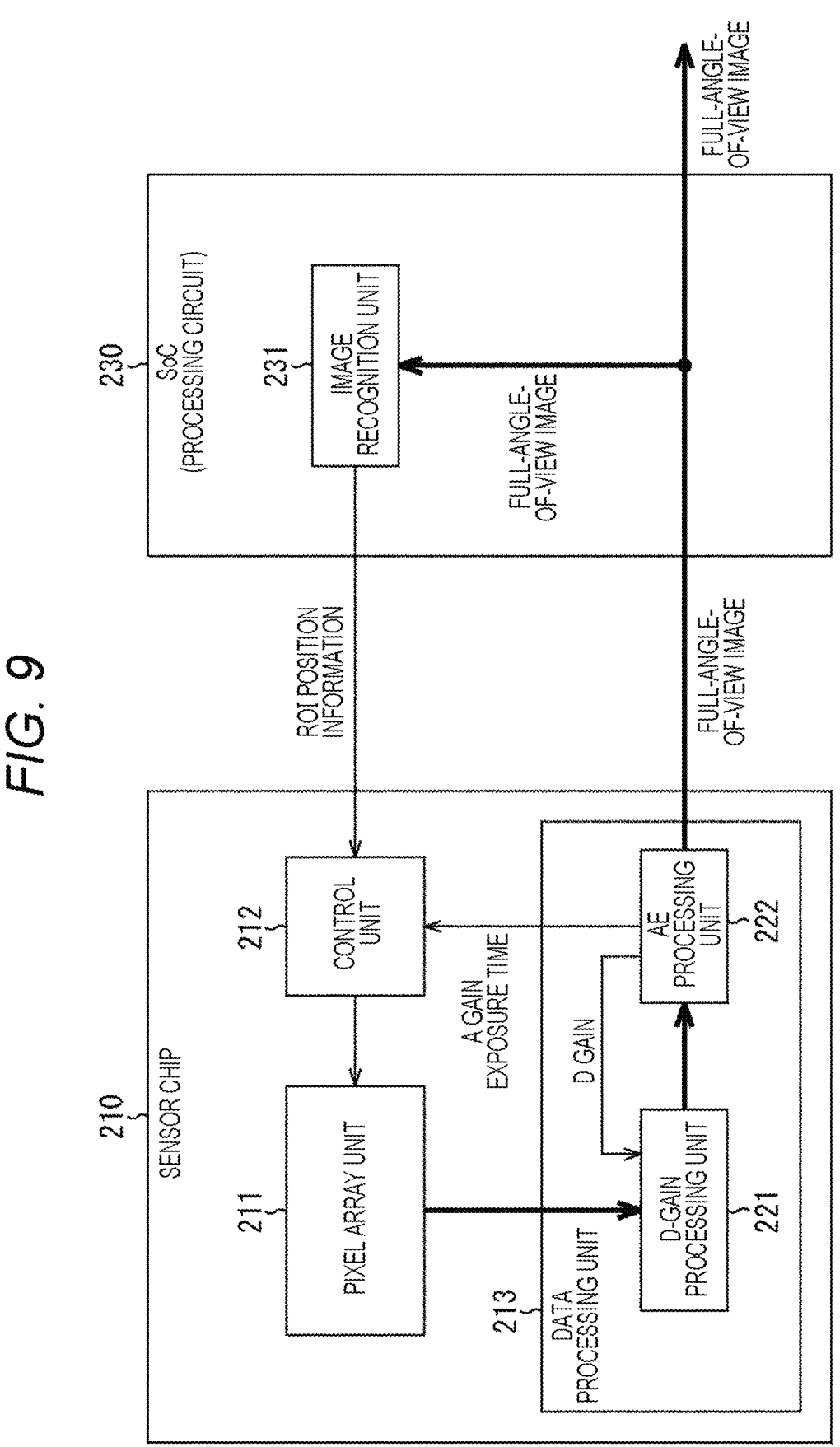
FIG. 9 is a diagram illustrating a configuration example of a sensor chip and an SoC according to a second embodiment.

FIG. 9 is a diagram illustrating a configuration example of a sensor chip and an SoC according to a second embodiment of the present disclosure.

As illustrated in FIG. 9, a sensor chip 210 includes a pixel array unit 211, a control unit 212, and a data processing unit 213, and an SoC 230 includes an image recognition unit 231.

The pixel array unit 211 and the control unit 212 included in the sensor chip 210 are configured similarly to the pixel array unit 11 and the control unit 12 described with reference to FIG. 5, respectively, and thus the description thereof is omitted. Furthermore, the image recognition unit 231 included in the SoC 230 is configured similarly to the image recognition unit 31 described with reference to FIG. 5.

The data processing unit 213 of the sensor chip 210 includes a D-gain processing unit 221 and an automatic exposure (AE) processing unit 222.

The D-gain processing unit 221 amplifies each piece of pixel data forming image data (full-angle-of-view image, ROI image) that is a digital signal, on the basis of the D gain (digital gain) calculated by the AE processing unit 222 in the subsequent stage. The full-angle-of-view image and the ROI images of the plurality of frames obtained by amplifying the pixel data are supplied to the AE processing unit 222.

The AE processing unit 222 is configured as the parameter calculation unit in the present embodiment. The AE processing unit 222 acquires luminance data as correction data from the ROI images of the plurality of frames from the D-gain processing unit 221, and calculates AE information (automatic exposure information) on the basis of the acquired luminance data.

In the SoC 230, a photometric region to be a luminance data acquisition target is determined as an ROI by scene determination based on image recognition by the image recognition unit 231. That is, the AE processing unit 222 acquires luminance data from the photometric region determined by the SoC 230 and calculates AE information.

The AE processing unit 222 calculates a D gain, an A (analog) gain, and an exposure time as the AE information. Among the calculated AE information, the D gain is supplied to the D-gain processing unit 221, and the A gain and the exposure time are supplied to the control unit 212. In the DSS driving mode, the control unit 212 drives each pixel of the pixel array unit 11 on the basis of the A gain and the exposure time from the AE processing unit 222. Furthermore, as described above, the D-gain processing unit 221 amplifies the pixel data of the full-angle-of-view image and the ROI image on the basis of the D gain from the AE processing unit 222. That is, the sensor chip 210 corrects the brightness of the full-angle-of-view image by the AE control based on the AE information calculated by the AE processing unit 222.

The AE processing unit 222 outputs the full-angle-of-view image from the D-gain processing unit 221, that is, the full-angle-of-view image of which the brightness has been corrected, to the SoC 230 at, for example, 30 fps.

Figure 10:
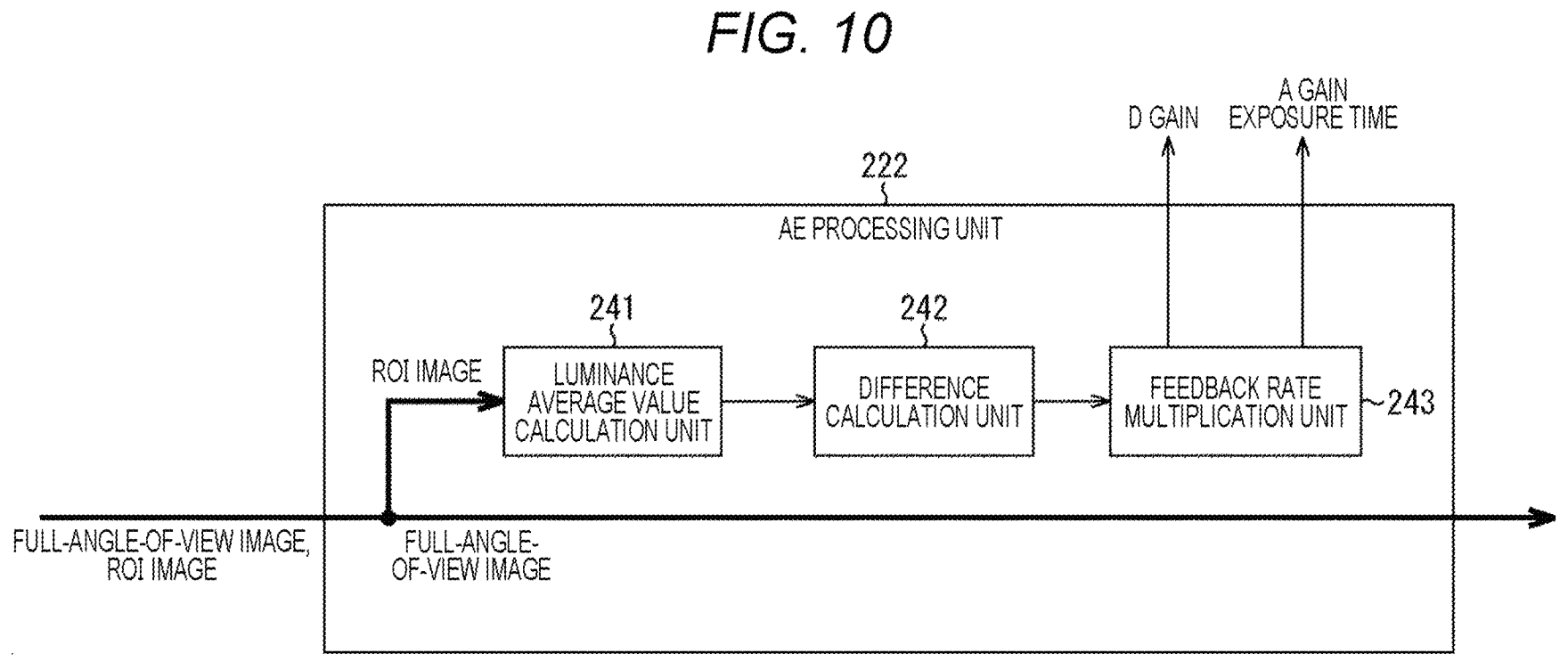

FIG. 10 is a diagram illustrating a detailed configuration example of the AE processing unit 222.

The AE processing unit 222 illustrated in FIG. 10 includes a luminance average value calculation unit 241, a difference calculation unit 242, and a feedback rate multiplication unit 243.

The luminance average value calculation unit 241 acquires luminance data from each of the ROI images of the plurality of frames from the D-gain processing unit 221, calculates an average value (luminance average value) thereof, and supplies the average value to the difference calculation unit 242.

The difference calculation unit 242 calculates a difference value between the luminance average value from the luminance average value calculation unit 241 and a preset target value of the luminance data, and supplies the difference value to the feedback rate multiplication unit 243.

The feedback rate multiplication unit 243 calculates a feedback rate as a weighting value for the AE information (D gain, A gain, exposure time) on the basis of the difference value from the difference calculation unit 242, and multiplies each of the D gain, the A gain, and the exposure time by the feedback rate. The weighted D gain is supplied to the D-gain processing unit 221, and the weighted A gain and the exposure time are supplied to the control unit 212.

According to the above configuration, the AE information can be calculated at high speed by using the sensor capable of DSS driving, so that it is possible to acquire a high-quality image with optimized brightness without decreasing the frame rate of the corrected image to be finally output.

6. Third Embodiment

Figure 11:
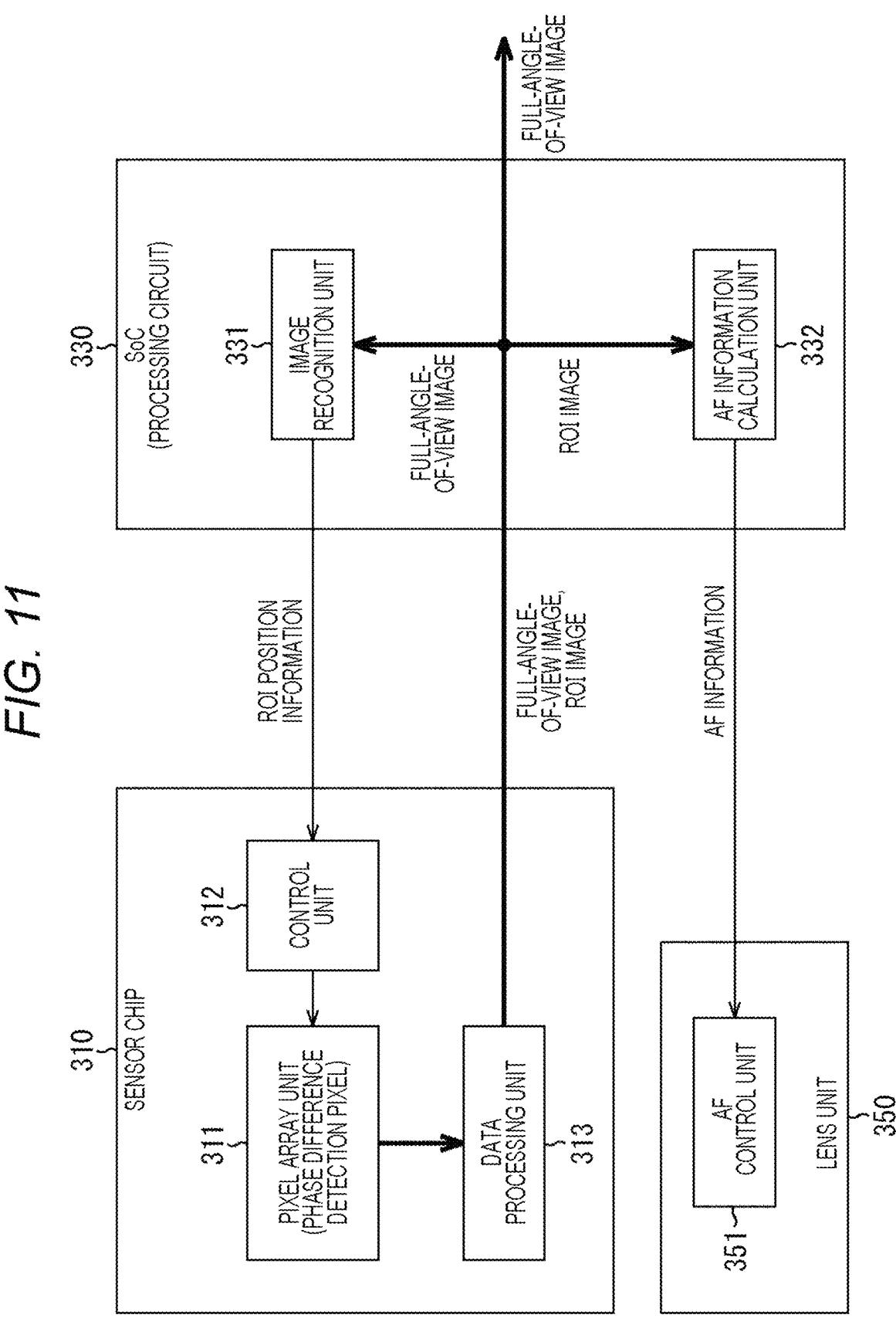
FIG. 11 is a diagram illustrating a configuration example of a sensor chip and an SoC according to a third embodiment.

FIG. 11 is a diagram illustrating a configuration example of a sensor chip and an SoC according to a third embodiment of the present disclosure.

As illustrated in FIG. 11, a sensor chip 310 includes a pixel array unit 311, a control unit 312, and a data processing unit 313, and an SoC 330 includes an image recognition unit 331 and an autofocus (AF) information calculation unit 332.

Furthermore, FIG. 11 illustrates a lens unit 350 including an optical system such as a lens in addition to the sensor chip 310 and the SoC 330. The lens unit 350 includes an AF control unit 351 that performs lens focus control.

The pixel array unit 311, the control unit 312, and the data processing unit 313 included in the sensor chip 310 are configured similarly to the pixel array unit 11, the control unit 12, and the data processing unit 13 described with reference to FIG. 5, respectively, and thus description thereof is omitted. However, the pixel array unit 311 includes a phase difference detection pixel capable of outputting phase difference pixel data (phase difference pixel signal) instead of a part of pixels that output normal pixel data (pixel signal).

The image recognition unit 331 included in the SoC 330 is configured similarly to the image recognition unit 31 described with reference to FIG. 5, and thus the description thereof is omitted. On the other hand, the AF information calculation unit 332 corresponds to the processing unit 32 described with reference to FIG. 5.

The AF information calculation unit 332 is configured as a parameter calculation unit in the present embodiment. The AF information calculation unit 332 acquires phase difference pixel data as correction data from ROI images of a plurality of frames from the sensor chip 10 to calculate AF information for performing lens focus control, and supplies the AF information to the AF control unit 351 of the lens unit 350.

In the SoC 330, a cutout region for lens focus control is determined as the ROI on the basis of the image recognition by the image recognition unit 331. That is, the AF information calculation unit 332 acquires phase difference pixel data from the cutout region determined by the SoC 330 and calculates AF information.

The AF control unit 351 of the lens unit 350 performs the lens focus control on the basis of the AF information from the AF information calculation unit 332. That is, the AF control unit 351 performs phase difference AF control. Therefore, the sensor chip 310 can output the full-angle-of-view image of which the focus has been corrected (adjusted) to the SoC 330 at, for example, 30 fps.

According to the above configuration, the AF information can be calculated at high speed by using the sensor capable of DSS driving, so that it is possible to acquire a high-quality image with appropriately adjusted focus without decreasing the frame rate of the corrected image to be finally output.

7. Fourth Embodiment

Figure 12:
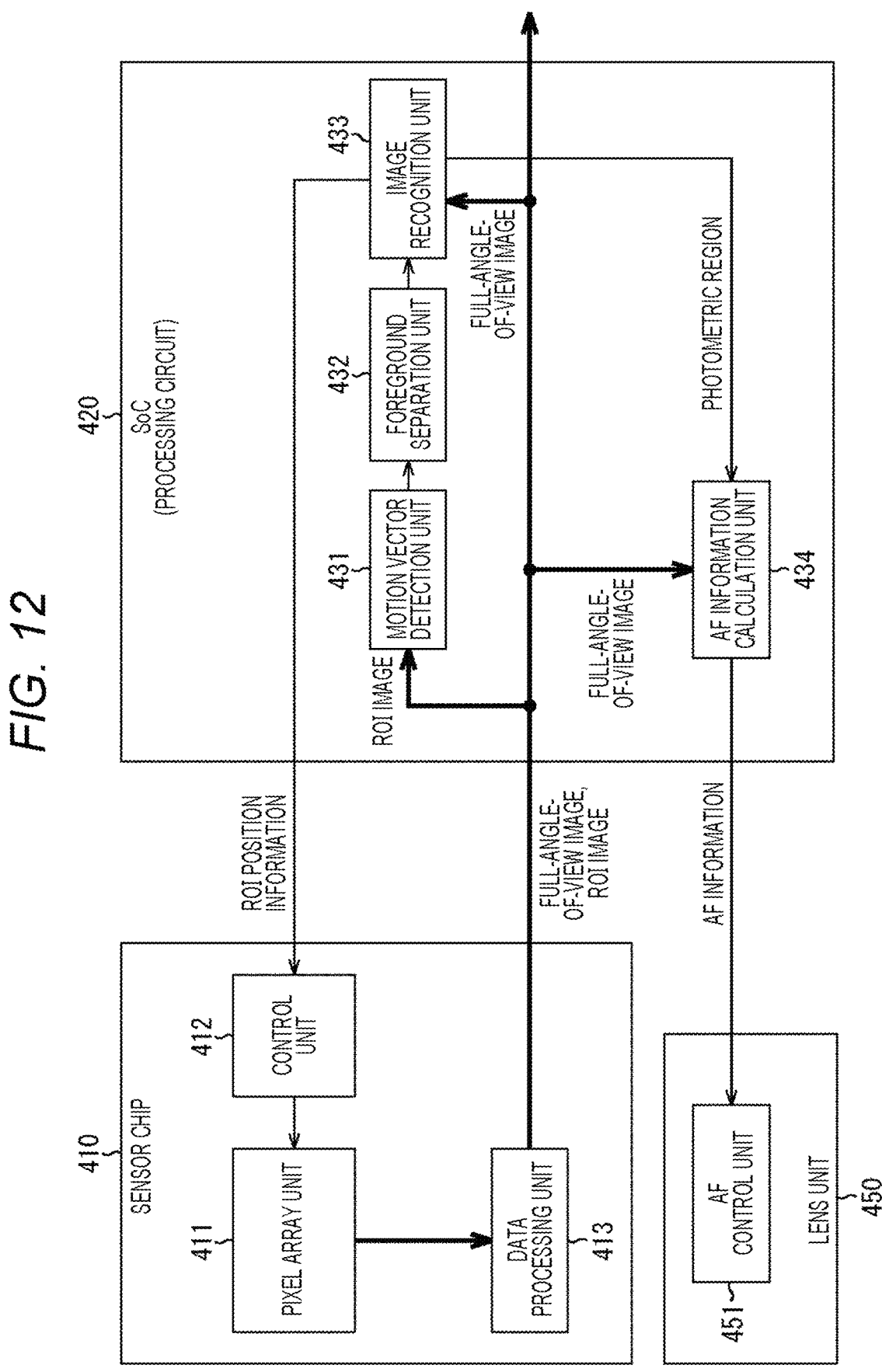
FIG. 12 is a diagram illustrating a configuration example of a sensor chip and an SoC according to a fourth embodiment.

FIG. 12 is a diagram illustrating a configuration example of a sensor chip and an SoC according to a fourth embodiment of the present disclosure.

As illustrated in FIG. 12, a sensor chip 410 includes a pixel array unit 411, a control unit 412, and a data processing unit 413, and an SoC 430 includes a motion vector detection unit 421, a foreground separation unit 422, an image recognition unit 423, and an AF information calculation unit 434.

Furthermore, FIG. 12 illustrates a lens unit 450 including an optical system such as a lens in addition to the sensor chip 410 and the SoC 430. The lens unit 450 includes an AF control unit 451 that performs lens focus control.

The pixel array unit 411, the control unit 412, and the data processing unit 413 included in the sensor chip 410 are configured similarly to the pixel array unit 11, the control unit 12, and the data processing unit 13 described with reference to FIG. 5, respectively, and thus description thereof is omitted.

An image recognition unit 433 included in the SoC 430 is basically configured similarly to the image recognition unit 31 described with reference to FIG. 5. On the other hand, a motion vector detection unit 431, a foreground separation unit 432, and an AF information calculation unit 434 correspond to the processing unit 32 described with reference to FIG. 5.

The motion vector detection unit 431 detects a motion vector as correction data from ROI images of a plurality of frames from the sensor chip 410. Specifically, the motion vector detection unit 431 detects the motion vector for each pixel between the frames of the ROI image of the plurality of frames forming the frame set.

The foreground separation unit 432 is configured as the parameter calculation unit in the present embodiment. The foreground separation unit 432 specifies a foreground region by separating the foreground region and a background region in the ROI image on the basis of the motion vector of each pixel detected by the motion vector detection unit 431.

On the basis of the foreground region specified by the foreground separation unit 432 and a subject region detected by the image recognition for the full-angle-of-view image, the image recognition unit 433 determines, as an ROI, a photometric region for measuring a contrast value used for lens focus control. The ROI position information indicating the position of the ROI is output to the sensor chip 410, and the information indicating the photometric region is supplied to the AF information calculation unit 434.

The AF information calculation unit 434 measures the contrast value of the photometric region indicated by the information from the image recognition unit 433 in the full-angle-of-view image from the sensor chip 410 to calculate AF information for performing the lens focus control, and supplies the AF information to the AF control unit 451 of the lens unit 450.

The AF control unit 451 of the lens unit 450 performs the lens focus control on the basis of the AF information from the AF information calculation unit 434. That is, the AF control unit 451 performs contrast AF control. Therefore, the sensor chip 410 can output the full-angle-of-view image of which the focus on a desired subject region has been adjusted to the SoC 430 at, for example, 30 fps.

According to the above configuration, the subject region can be separated at a high speed by using the sensor capable of DSS driving, so that it is possible to acquire a high-quality image in which the focus is adjusted by higher-performance contrast AF.

8. Specifications Required for SoC

A certain specification is required on the SoC (processing circuit) side that processes the ROI image output at a high frame rate from the sensor chip driven in the DSS driving mode.

(1) Capacity of ROM (RAM) for Storing High-Frame-Rate ROI Image

In the SoC as in the first embodiment described above, it is necessary to secure the capacity of a read only memory (ROM) or a random access memory (RAM) according to the number of frames of an ROI image necessary for calculating blur information.

(2) Support for Special Output Format

Figure 13:
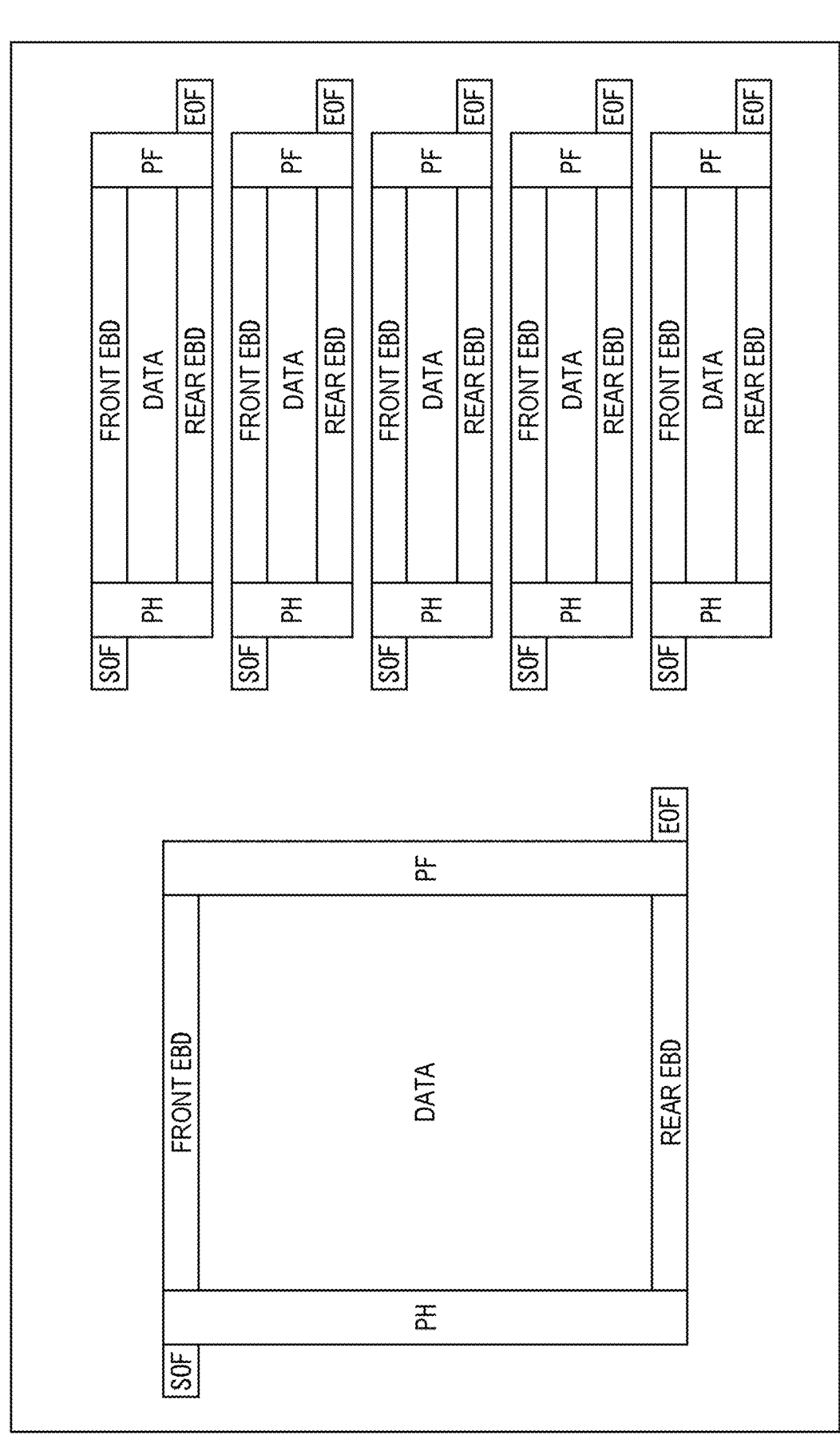
FIG. 13 is a diagram illustrating an example of an output format of an image.

From the sensor chip driven in the DSS driving mode, for example, a plurality of images (ROI images) in a special output format corresponding to the ROI illustrated on the right side of FIG. 13 is output in addition to the image (full-angle-of-view image) in a normal output format illustrated on the left side of FIG. 13. On the SoC side, performance for accepting image data in such a special output format is required. Note that the full-angle-of-view image and the plurality of ROI images output as image data from the sensor chip are output asynchronously (at different timings) with each other.

(3) Processing Time and Reflection on Register

Figure 14:
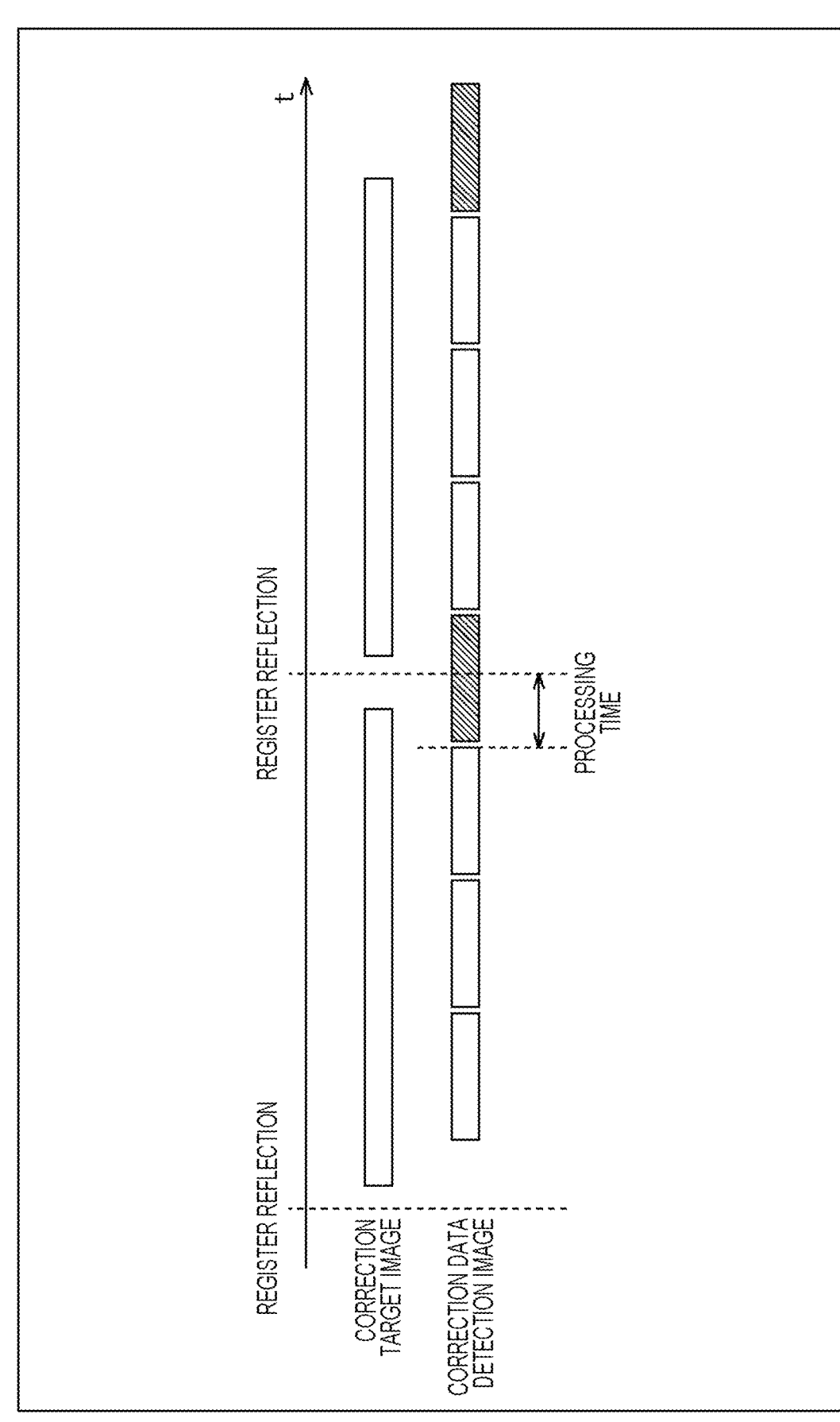
FIG. 14 is a diagram for explaining processing time and reflection on a register.

As illustrated in FIG. 14, a processing time required for the correction based on the correction parameter calculated from the correction data detection image output at a high frame rate needs to be completed before a timing of register reflection of the correction target image (corrected image) of the next frame set on which the correction is reflected. If the processing time is not in time for the timing of register reflection of the correction target image (corrected image) in the next frame set, the correction based on the correction parameter is reflected on the correction target image in the next frame set.

As described above, by adopting the SoC (processing circuit) satisfying the above-described requirements, it is possible to more suitably acquire a high-quality image.

9. Application Example

The technology according to the present disclosure may be applied to various products. More specifically, the present invention can be applied to an electronic apparatus including: an imaging device such as a digital still camera or a video camera; a mobile terminal device having an imaging function such as a mobile phone; a copier using an imaging element in an image reading unit; and the like. Hereinafter, a case of application to the imaging device such as a digital still camera or a video camera is described.

Figure 15:
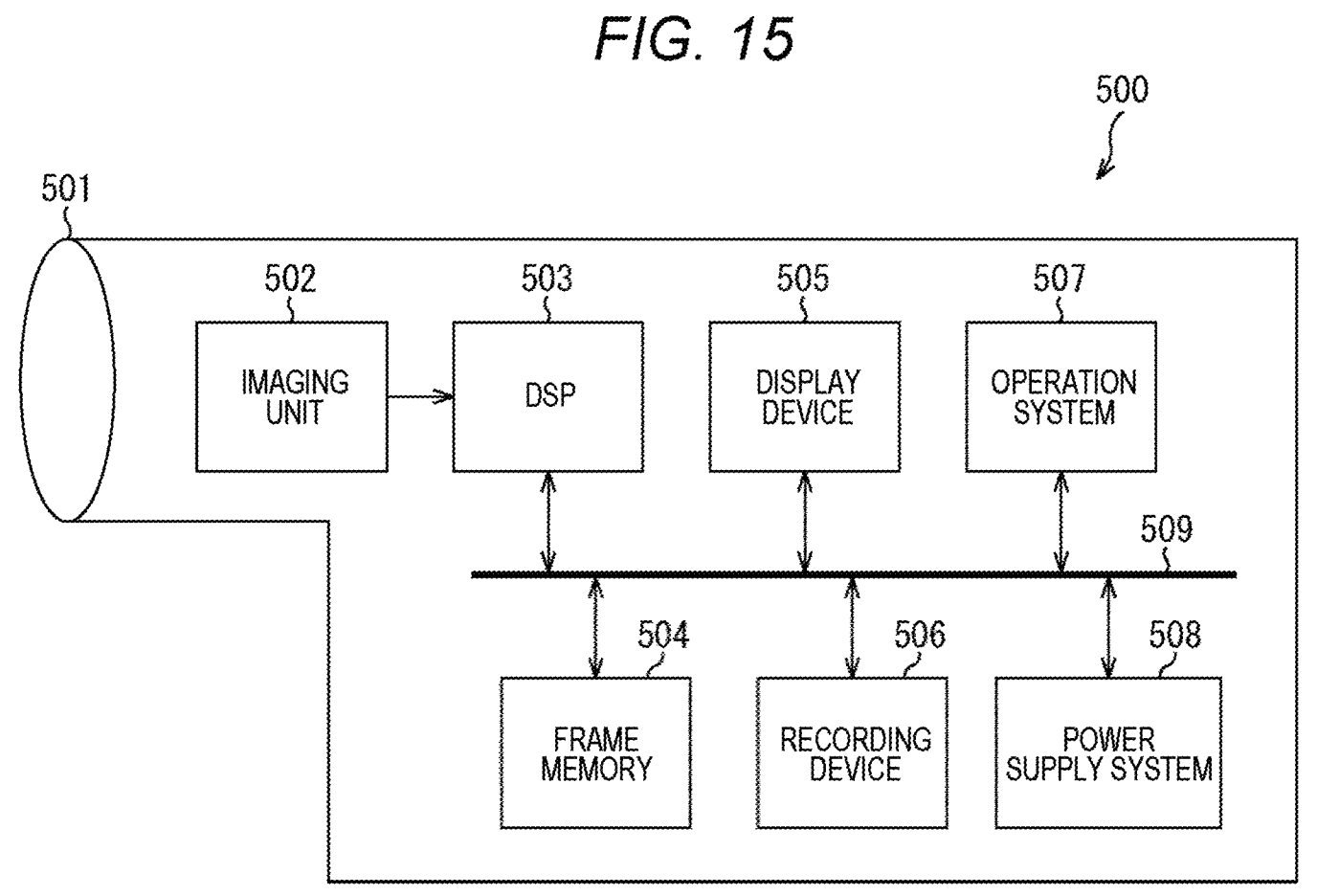

FIG. 15 is a block diagram illustrating a configuration of the imaging device that is an example of the electronic apparatus. As illustrated in FIG. 15, an imaging device 500 according to the present embodiment includes an imaging optical system 501 including a lens group and the like, an imaging unit 502, a digital signal processor (DSP) circuit 503, a frame memory 504, a display device 505, a recording device 506, an operation system 507, and a power supply system 508. The DSP circuit 503, the frame memory 504, the display device 505, the recording device 506, the operation system 507, and the power supply system 508 are connected to one another via a bus line 509.

The imaging optical system 501 captures incident light (image light) from a subject and forms an image on an imaging surface of the imaging unit 502. The imaging unit 502 converts a light amount of the incident light of which an image is formed on the imaging surface thereof by the imaging optical system 501 to an electric signal in units of pixel and outputs the electric signal as a pixel signal. The DSP circuit 503 performs general camera signal processing, for example, white balance processing, demosaic processing, gamma correction processing and the like.

The frame memory 504 is appropriately used for storing data during signal processing in the DSP circuit 503. The display device 505 includes a panel display device such as a liquid crystal display device or an organic electro luminescence (EL) display device, and displays a moving image or a still image captured by the imaging unit 502. The recording device 506 records the moving image or the still image captured by the imaging unit 502 on a recording medium such as a portable semiconductor memory, an optical disk, or a hard disk drive (HDD).

The operation system 507 issues operation commands for various functions of the imaging device 500 according to an operation performed by the user. The power supply system 508 appropriately supplies various power supplies, which are operation power supplies of the DSP circuit 503, the frame memory 504, the display device 505, the recording device 506, and the operation system 507, to these power supply targets.

In the imaging device 500 having the above-described configuration, each of a sensor chip capable of DSS driving according to the above-described embodiment and an SoC that feeds back ROI position information to the sensor chip in real time can be adopted as each of the imaging unit 502 and the DSP 503. Therefore, it is possible to more suitably acquire a high-quality image also in the imaging device 500.

The embodiment of the present disclosure is not limited to the above-described embodiments, and various modifications can be made without departing from the scope of the present disclosure.

The effects described in the present specification are merely examples and are not limited, and other effects may be provided.

Moreover, the present disclosure may have the following configurations.

(1)

An imaging device including:

a sensor chip which includes a pixel control unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate;

a parameter calculation unit which calculates a correction parameter for correcting the full-angle-of-view image on the basis of the region images of the plurality of frames; and a processing circuit which includes a processing unit which outputs the full-angle-of-view image reflecting correction based on the correction parameter to a subsequent stage.

(2)

The imaging device according to (1), in which the processing circuit outputs, to a subsequent stage, the full-angle-of-view image corrected by using the correction parameter.

(3)

The imaging device according to (1), in which the sensor chip outputs, to the processing circuit, the full-angle-of-view image corrected by using the correction parameter.

(4)

The imaging device according to (1), in which the processing circuit determines the specific region in the pixel region on the basis of image recognition for the full-angle-of-view image, and the sensor chip outputs the region image by reading a pixel signal of the specific region determined by the processing circuit.

(5)

The imaging device according to (2) or (4), in which the parameter calculation unit calculates blur information on the basis of motion vectors detected from the region images of the plurality of frames, and the processing circuit corrects blur of the full-angle-of-view image on the basis of the calculated blur information.

(6)

The imaging device according to (5), in which the processing circuit determines the specific region by detecting a notable subject which is a detection target of the motion vector on the basis of the image recognition.

(7)

The imaging device according to (3) or (4), in which the parameter calculation unit calculates automatic exposure information on the basis of luminance data acquired from the region images of the plurality of frames, and the sensor chip corrects brightness of the full-angle-of-view image by automatic exposure control based on the calculated automatic exposure information.

(8)

The imaging device according to (7), in which the processing circuit determines, as the specific region, a photometric region as an acquisition target of the luminance data by scene determination based on the image recognition.

(9)

The imaging device according to (4), in which the sensor chip includes a phase difference detection pixel capable of outputting phase difference pixel data to the pixel region, and the parameter calculation unit calculates focus control information for performing lens focus control on the basis of the phase difference pixel data acquired from the region images of the plurality of frames.

(10)

The imaging device according to (9), further including:

a focus control unit which performs the lens focus control on the basis of the calculated focus control information.

(11)

The imaging device according to (9) or (10), in which the processing circuit determines, as the specific region, a cutout region for the lens focus control on the basis of the image recognition.

(12)

The imaging device according to (4), in which the parameter calculation unit specifies a foreground region on the basis of motion vectors detected from the region images of the plurality of frames, and the processing circuit determines, as the specific region, a photometric region for measuring a contrast value used for lens focus control on the basis of the specified foreground region and a subject region detected by the image recognition.

(13)

The imaging device according to (12), in which the processing circuit calculates focus control information for performing the lens focus control on the basis of the contrast value measured in the photometric region.

(14)

The imaging device according to (13), further including:

a focus control unit which performs the lens focus control on the basis of the calculated focus control information.

(15)

A sensor chip including:

a pixel control unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate;

a parameter calculation unit which calculates a correction parameter for correcting the full-angle-of-view image on the basis of the region images of the plurality of frames; and a processing unit which outputs the full-angle-of-view image corrected by using the correction parameter.

(16)

A processing circuit including:

a parameter calculation unit which calculates a correction parameter for correcting the full-angle-of-view image on the basis of region images of a plurality of frames output from a sensor chip enabling simultaneous output of a full-angle-of-view image of one frame and the region images of the plurality of frames by reading pixel signals of an entire pixel region at a first frame rate and reading pixel signals of a specific region in the pixel region at a second frame rate higher than the first frame rate; and a processing unit which outputs, to a subsequent stage, the full-angle-of-view image corrected by using the correction parameter.

REFERENCE SIGNS LIST

10 Sensor chip
11 Pixel array unit
12 Control unit
13 Data processing unit
30 SoC
31 Image recognition unit
32 Processing unit

500 Imaging device
502 Imaging unit
503 DSP

The invention claimed is:

1. An imaging device comprising:
a sensor chip which includes a pixel control unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate;
a parameter calculation unit which calculates a correction parameter for correcting the full-angle-of-view image on a basis of the region images of the plurality of frames; and
a processing circuit which includes a processing unit which outputs the full-angle-of-view image reflecting correction based on the correction parameter to a subsequent stage.

2. The imaging device according to claim 1, wherein
the processing circuit outputs, to a subsequent stage, the full-angle-of-view image corrected by using the correction parameter.

3. The imaging device according to claim 1, wherein
the sensor chip outputs, to the processing circuit, the full-angle-of-view image corrected by using the correction parameter.

4. The imaging device according to claim 1, wherein
the processing circuit determines the specific region in the pixel region on a basis of image recognition for the full-angle-of-view image, and
the sensor chip outputs the region image by reading a pixel signal of the specific region determined by the processing circuit.

5. The imaging device according to claim 4, wherein
the parameter calculation unit calculates blur information on a basis of motion vectors detected from the region images of the plurality of frames, and
the processing circuit corrects blur of the full-angle-of-view image on a basis of the calculated blur information.

6. The imaging device according to claim 5, wherein
the processing circuit determines the specific region by detecting a notable subject which is a detection target of the motion vector on a basis of the image recognition.

7. The imaging device according to claim 4, wherein
the parameter calculation unit calculates automatic exposure information on a basis of luminance data acquired from the region images of the plurality of frames, and
the sensor chip corrects brightness of the full-angle-of-view image by automatic exposure control based on the calculated automatic exposure information.

8. The imaging device according to claim 7, wherein
the processing circuit determines, as the specific region, a photometric region as an acquisition target of the luminance data by scene determination based on the image recognition.

9. The imaging device according to claim 4, wherein
the sensor chip includes a phase difference detection pixel capable of outputting phase difference pixel data to the pixel region, and
the parameter calculation unit calculates focus control information for performing lens focus control on a basis of the phase difference pixel data acquired from the region images of the plurality of frames.

10. The imaging device according to claim 9, further comprising:
a focus control unit which performs the lens focus control on a basis of the calculated focus control information.

11. The imaging device according to claim 9, wherein
the processing circuit determines, as the specific region, a cutout region for the lens focus control on a basis of the image recognition.

12. The imaging device according to claim 4, wherein
the parameter calculation unit specifies a foreground region on a basis of motion vectors detected from the region images of the plurality of frames, and
the processing circuit determines, as the specific region, a photometric region for measuring a contrast value used for lens focus control on a basis of the specified foreground region and a subject region detected by the image recognition.

13. The imaging device according to claim 12, wherein
the processing circuit calculates focus control information for performing the lens focus control on a basis of the contrast value measured in the photometric region.

14. The imaging device according to claim 13, further comprising:
a focus control unit which performs the lens focus control on a basis of the calculated focus control information.

15. A sensor chip comprising:
a pixel control unit enabling simultaneous output of a full-angle-of-view image of one frame and region images of a plurality of frames by reading pixel signals of an entire pixel region at a first frame rate and reading pixel signals of a specific region in the pixel region at a second frame rate higher than the first frame rate;
a parameter calculation unit which calculates a correction parameter for correcting the full-angle-of-view image on a basis of the region images of the plurality of frames; and
a processing unit which outputs the full-angle-of-view image corrected by using the correction parameter.

16. A processing circuit comprising:
a parameter calculation unit which calculates a correction parameter for correcting the full-angle-of-view image on a basis of region images of a plurality of frames output from a sensor chip enabling simultaneous output of a full-angle-of-view image of one frame and the region images of the plurality of frames by reading pixel signals of an entire pixel region at a first frame rate and reading pixel signals of a specific region in the pixel region at a second frame rate higher than the first frame rate; and
a processing unit which outputs, to a subsequent stage, the full-angle-of-view image corrected by using the correction parameter.

*   *   *   *   *